United States Patent [19]
Walker

[11] Patent Number: 5,872,887
[45] Date of Patent: Feb. 16, 1999

[54] PERSONAL VIDEO, AND SYSTEM AND METHOD OF MAKING SAME

[75] Inventor: Stephen S. Walker, Marlborough, Mass.

[73] Assignee: GTE Laboratories Incorporated, Waltham, Mass.

[21] Appl. No.: 748,895

[22] Filed: Nov. 14, 1996

Related U.S. Application Data

[60] Provisional application No. 60/028,031, Oct. 8, 1996.

[51] Int. Cl.⁶ .............................. H04N 5/225; H04N 5/91

[52] U.S. Cl. ............................................. 386/117; 386/46

[58] Field of Search ...................................... 386/117, 118, 386/46, 38, 4, 52, 64, 107; 348/143, 157, 158, 159, 207, 155; 360/27, 69, 72; H04N 5/225, 5/91

[56] References Cited

U.S. PATENT DOCUMENTS

| | | | |
|---|---|---|---|
| 5,333,061 | 7/1994 | Nakashima et al. | 386/46 |
| 5,655,053 | 8/1997 | Renie | 386/117 |

*Primary Examiner*—Robert Chevalier
*Attorney, Agent, or Firm*—Leonard Charles Suchyta; Floyd E. Anderson

[57] ABSTRACT

A personal video involving activities of a subscriber at an amusement park, which includes personal segments recorded by a plurality of video cameras, environ segments separately recorded and interleaved between the personal segments, and text. The organization of certain segments of the personal video is determined by a subscriber who registers identification and information data prior to activating the cameras. Upon completion of the recording, the personal segments, the text and environ segments are assembled, processed, and duplicated for delivery to the subscriber. The environ segments are selected to display weather conditions existing at the time of recording the personal video segments.

7 Claims, 6 Drawing Sheets

PERSONAL VIDEO, AND SYSTEM AND METHOD OF MAKING SAME

This application claims the benefit of U.S. provisional application entitled "Automated Personal Video System" filed Oct. 8, 1996 and bears Ser. No. 60/028,031 which application is incorporated by reference herein.

BACKGROUND OF THE INVENTION

1. Field of Invention

The present invention relates to a personal video; and more particularly, to a medium configured to play a personal video, and the apparatus and method for making a composite personal video of segments that take place at different times and at diverse geographic locations.

Although the present invention has a wide range of applications, it is particularly suitable for amusement or theme parks having many different attractions, and will be described in that connection.

2. Description of Related Art

With the advent of the camcorder and VCR, the making of home video movies has replaced to a great extent, the taking of still photographs of events or activities that one wishes to remember. However, if traveling with friends or family, one person, usually the host or parent, not only has extra baggage to carry in the form of a camera, batteries and supplies, but he or she spends a great amount of time taking movies of the other members of the family, and the various attractions that the group visited. This, of course, detracts from the pleasure of the event for the person operating the camcorder, in that a great part of the activities of interest are seen through the viewfinder of the camcorder. Also, when visiting tourist attractions, with the camcorder exposed and ready to capture a photo opportunity, there is an increased risk of damage and theft for the camcorder. Additionally, the video cameraman of the group seldom has the opportunity of being included in scenes of the movies. Finally, the movie itself, although treasured for its remembrance value, in most instances does not reach a level approaching professionalism, because all scenes are usually shot at the same angle with the camera being the same distance from the ground. Also, an unsteady camcorder, too fast panning, poor focus, and poor lighting detract from the final product.

After the family returns from the video taped activity, it is desirable to edit the tape to remove undesirable footage, and to include text that identifies the activity and places visited, which, of course, is time consuming and relatively expensive. Therefore, in most cases, the tape goes unedited, and because of this lack of editing, as well as the quality of the shooting, the tape is viewed once or twice, and then put away, sometimes never to be shown again.

In light of the foregoing, there is a need for an improved personal video production, and system and method for making same, which overcomes the disadvantages of taking your own video movies while visiting a particular activity.

SUMMARY OF THE INVENTION

Accordingly, the present invention is directed to a personal video production, and the apparatus and method of making the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the product and the apparatus and method for making the product particularly pointed out in the written description and claims hereof as well as the appended drawings.

To achieve these and other advantages and in accordance with the purpose of the invention, as embodied and broadly described, the invention includes a video recording medium configured to include a plurality of personal video segments, each said personal video segment having been recorded by a different video camera of a plurality of video cameras geographically spaced from one another to have a different field of view, each said different field of view including an individual personage common to the plurality of personal video segments at an activity related to the field of view. The recording medium further includes a plurality of separately recorded environ field of view video segments interleaved between selected ones of the plurality of personal video segments. The plurality of environ video segments have fields of view recorded separately from the recording of any one of the plurality of personal video segments and a plurality of video text segments on the video recording medium associated with selected ones of the plurality of personal video segments, said text and its association being selected for recording by the individual common to the fields of view of the plurality of personal video segments.

In another aspect, the present invention is a method of producing a plurality of personal videos concomitantly, wherein each of the personal videos includes a plurality of personal video segments, a plurality of pre-recorded environ segments, and a plurality of text segments, said method comprising the steps of mounting a video camera at each of a plurality of geographically diverse locations and oriented to record a selected field of view; positioning identification detectors at locations adjacent each of the selected fields of view to indicate the presence of a particular subscriber; storing in a registration unit the identity of a plurality of individual subscribers together with text and segments of separately recorded environ fields of view; triggering a plurality of the video cameras to record the activities of the plurality of individual subscribers at each of the geographically diverse locations; down loading each of the recorded activities of the plurality of individual subscribers to a personal storage unit to provide personal video segments of a plurality of different subscribers; repeating the steps of triggering and downloading to store a plurality of personal segments of the same individual subscribers and different individual subscribers; interleaving pre-recorded environ video segments between the plurality of down loaded segments and associating text therewith of segments having the same identification code, to form for each subscriber a personal video having assembled personal, environ, and text segments upon completion of the recording of personal segments of a respective individual subscriber; and duplicating each of a plurality of the assembled interleaved personal videos of a respective individual subscriber to provide a video personal to each of the plurality of individual subscribers.

In still another aspect, a system for recording a personal video on a video recording medium, said personal video having a plurality of personal video segments, each including a subscriber in a field of view, a plurality of separately recorded environ video segments, each including a field of view lacking the subscriber, and a plurality of video text segments, said system comprising a registration module responsive to inputs of a subscriber to store a distinctive code, said distinctive code including subscriber identification code and code for selecting the plurality of environ video segments; a video collection subsystem including a plurality of video cameras and subscriber detectors, each of the plurality of video cameras being positioned geographically spaced from one another and oriented to record, when activated, one of the plurality of personal video segments, each of the plurality of subscriber detectors being associated with one of the plurality of video cameras and responsive to the distinctive code to generate an activation signal and a subscriber identification signal. The system includes an environ video storage module storing a plurality of environ segments, a text generator; and a personal storage module. A master controller governed by the registration module, identification data and activation signal to download one of the plurality of personal video segments along with subscriber identification into the personal storage module, an assembly and processing module responsive to the master controller to assemble stored environ video segments, stored personal segments, and generate text segments in accordance with the subscriber input to the registration unit. A duplication unit permanently records the plurality of personal segments, environ segments, and text in a predetermined sequence for displaying on a VCR or Video Disc Player.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

DESCRIPTION OF THE PREFERRED EMBODIMENT

Figure 1:
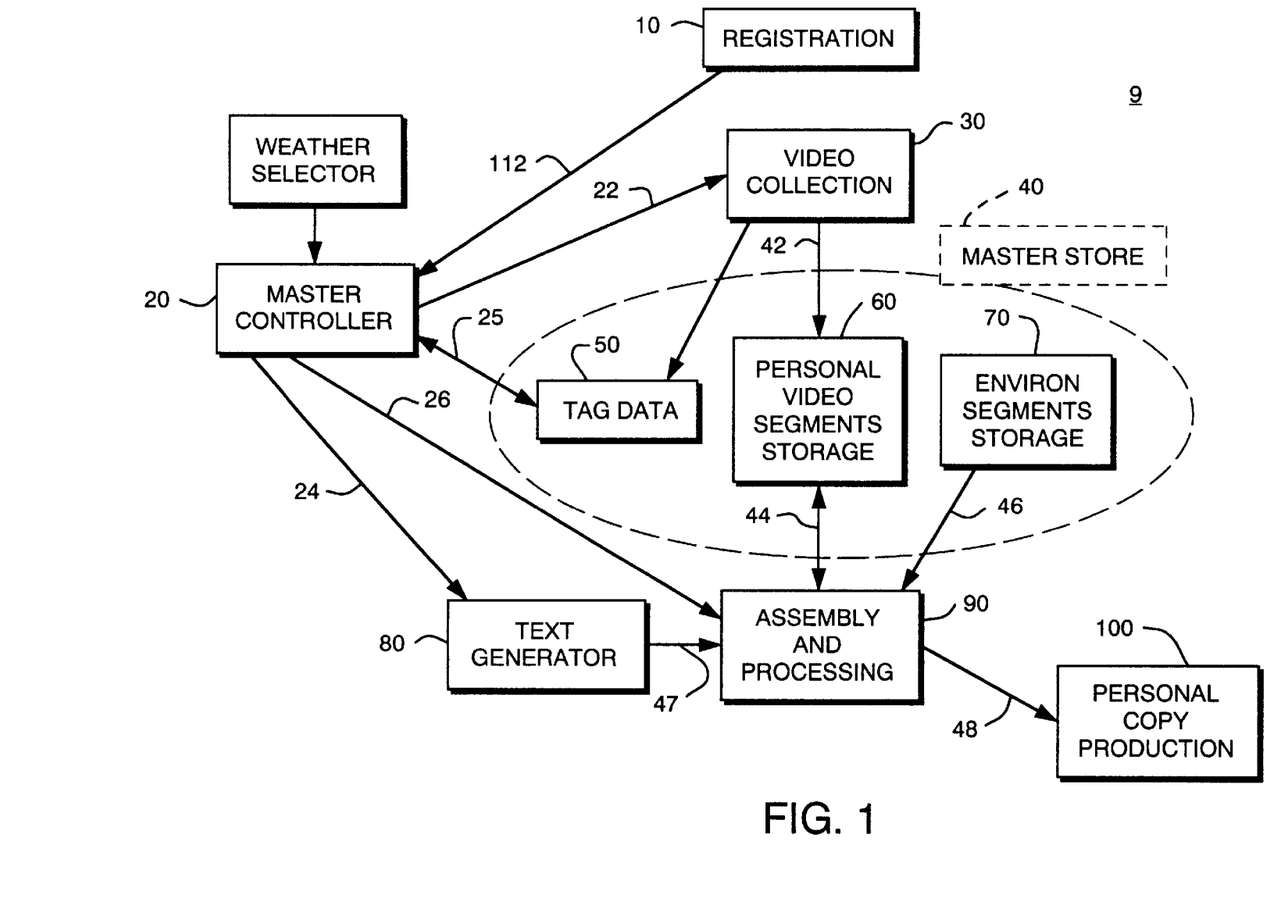
FIG. 1 is a block diagram of a video system of the present invention illustrating the flow of video/audio and data signals.

Reference will now be made in detail to the present preferred embodiment of the invention, an example of which is illustrated in the accompanying drawings. The exemplary embodiment of the apparatus for making the personal video is illustrated in FIG. 1, and is designated generally by reference numeral 9. The term video is used throughout this document, for convenience of expression; however, such term is also intended to include accompanying audio.

System 9 of the present invention includes a registration subsystem 10 for inputting information relating to subscribers, weather selector 11 for inputting weather conditions, a master controller 20, a video collection subsystem 30, a storage subsystem 40, which includes a tag data storage unit 50, a personal video storage unit 60, and an environ storage unit 70. A text generator 80, an assembly and processing subsystem 90, and personal copy production apparatus 100 complete the system.

Registration subsystem 10 includes well known components that activate subscriber tags 130 (see FIG. 2) and associate the tag with the particular subscriber, and the date and times the tag is valid. In addition, the registration subsystem provides the system with special information, such as the content for a custom title and text, specific environ segments, and the inclusion of a custom credit section to complete the video. The environ video segments may include, for each weather condition, the arrival (or departure) of an airplane of a selected airline at a local airport, the parking lot of the amusement park, the hotel at which the users are staying, general views of the various attractions, typical travelogue type scenes of the general area, and anything else that would add interest and professionalism to a personal video.

The registration subsystem 10 may also include billing information for the subscriber.

Master controller 20 controls the behavior of the system 9 by appropriate hardware and software from registration through assembly and processing. It receives data from the registration subsystem 10 over line 12 and transmits and receives over line 25 tag or card data relating to the identity of the subscribers, the desired text over line 24, and any other special requests which the system 9 is capable of implementing. Also, the controller 20 transmits data over line 22 to the video collection subsystem 30 to enable the collection of video in the proper time slots, and storing of the personal video segments. Any personal video segments are deleted over lines 26 and 44. Additionally, the master controller transmits data over line 24 to text generator 80 for insertion of customized text in the video; and transmits data over line 26 to the assembly and processing unit 90 relating to the identity of the environ segments to be included in a particular video.

Figure 2:
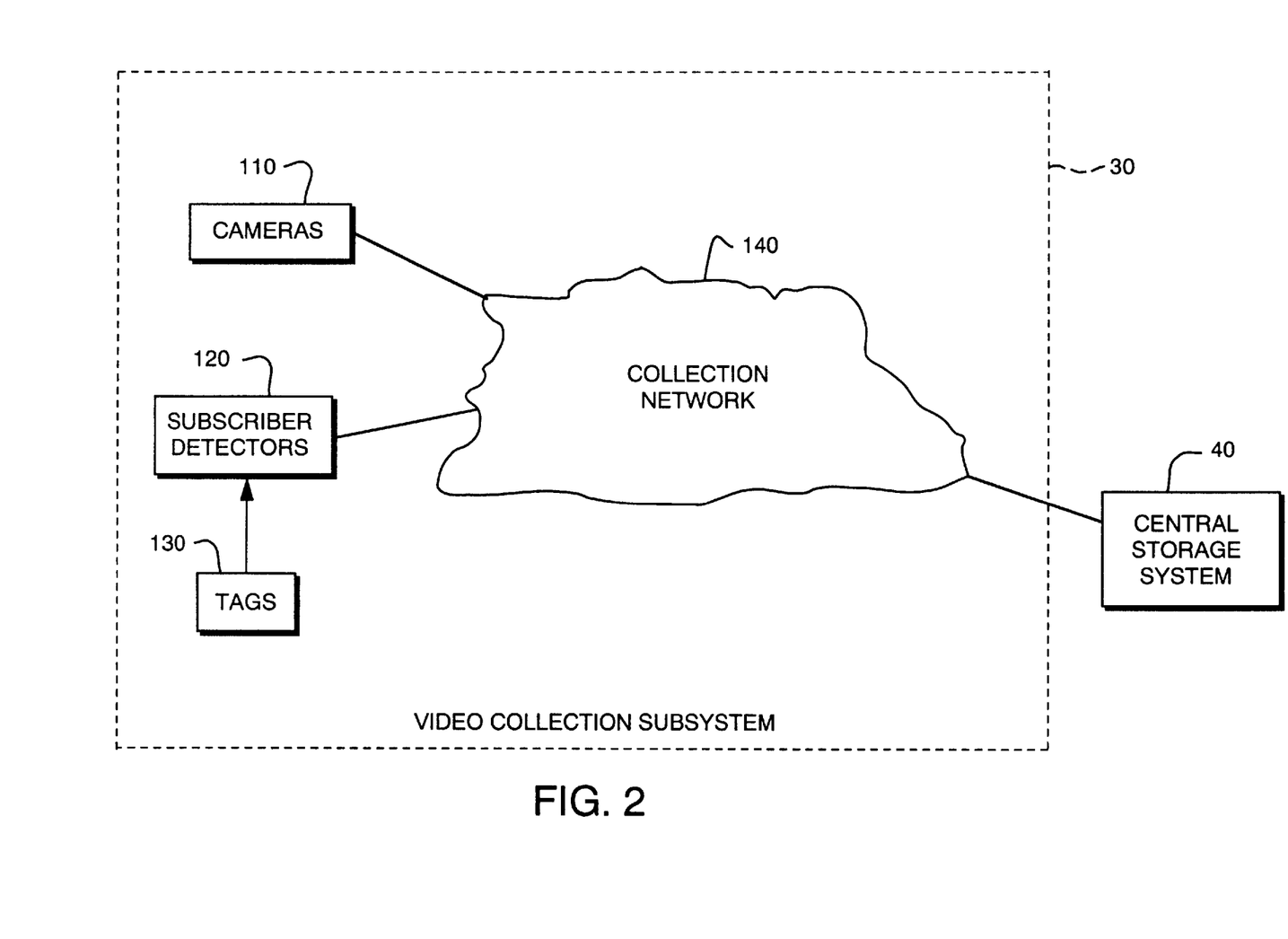
FIG. 2 is a block diagram of the video collection subsystem of the system of FIG. 1.

Video collection subsystem 30, details of which are illustrated in FIG. 2, includes a plurality of video cameras 110, subscriber detectors 120 for detecting tags 130, and a collection network 140. The video cameras 110 are located throughout the amusement park at strategic locations. Some of the cameras may be stationary and oriented to photograph a defined area. Other cameras may be mounted to follow a certain path when triggered. For example, a video camera may be positioned to focus on a roller coaster as it approaches the camera or it may follow the roller coaster during one or more descents. There may be a camera mounted above each ferris wheel passenger compartment, a midget auto racetrack location, and at strategic locations to photograph a myriad of other activities and attractions one would expect to find at a large amusement park. Each of these cameras would preferably be installed and oriented to provide a field of view that would be out of reach of an individual standing at floor or ground level and provide a segment that could not be obtained by an amateur cameraman without extensive equipment and props.

When a subscriber is identified as being on a ride by the response of subscriber detector 120 to a tag or card 130, the corresponding camera 110 is triggered to transmit video to personal storage module 60 of central storage system 40 via the collection network 140. As an alternative, each one of the cameras 110 may run continuously over the network 140 with the central storage system 40 being triggered by the tag 130 and detector 120 to capture the video delivered over the collection network 140.

Subscriber detectors 120 may be of any well known type, such as the type used to validate credit cards, or dispense money, or gasoline, for example. Where a card or tag 130 with a magnetic stripe is swiped or inserted and removed as a subscriber gets on a ride or enters an attraction. This data then logically links the subscriber and the particular attraction or car together. As the car passes certain points in a cameras view, the car identity triggers the video collection which is correlated with the identity of the subscriber in the tag data storage 50. Also, passive or active RF tags may be used of the type generally used for tracking livestock or warehouse inventory. With this approach the proximity of a tag 130 and detector 120 would trigger the video event.

Collection network 140 is the infrastructure used to transmit the data and audio/video signals to the central data storage subsystem 40. This network may use any number of well known technologies including fiber optics, coaxial cable, copper wire, or wireless, for example.

The central storage subsystem 40, which is the repository for the various segments of audio/video necessary to complete the production of the personal video for an individual subscriber, may be a computer with sufficient video data storage to store the individual personal video storage segments over line 42 when captured by the video cameras as. The tag data storage unit 50 of the central storage unit 40 receives the data from an individual tag 130 and the corresponding detector 120 via the collection network 140. The data from the tag data storage unit is accurately aligned with each associated segment of the personal video transmitted by the different cameras 110 at diverse locations. The separately recorded environ segments, which include high production value shots of attractions and various views, as previously described, are stored in the environs segment storage unit 70 and transmitted when ready for final assembly and processing by component 90.

Assembly and processing module or subsystem 90 receives audio/video signals from the personal video storage 60 over line 44, environs segment storage 70 over line 46, and text generator 80 over line 47 at times and in a sequence as controlled by data signals from the master controller 20 over line 26. Typically, a custom title, which was entered into the system by the registration subsystem 10, is created by the text generator 80, after which the environ segment of arrival from the environ segment storage unit 70 is added. Then, depending on the instructions from the master controller 20, as determined by the behavior of the subscriber in the park, the personal video segments from storage unit 60 are interleaved with environ segments from storage unit 70 and text from text generator 80, which is followed by personalized credits at the end thereof.

The assembled and processed segments are transmitted to a personal production subsystem 100 over line 48 from which the subscribers copy of the personal video is delivered. The duplication subsystem is typically a bank of VCR's and disc recorders that are used to produce the deliverable copy. Each of the VCR's or disc recorders receive audio/video signals from the storage units 60 and 70, and text generator 80 in the sequence as controlled by the master controller 20.

Figure 3:
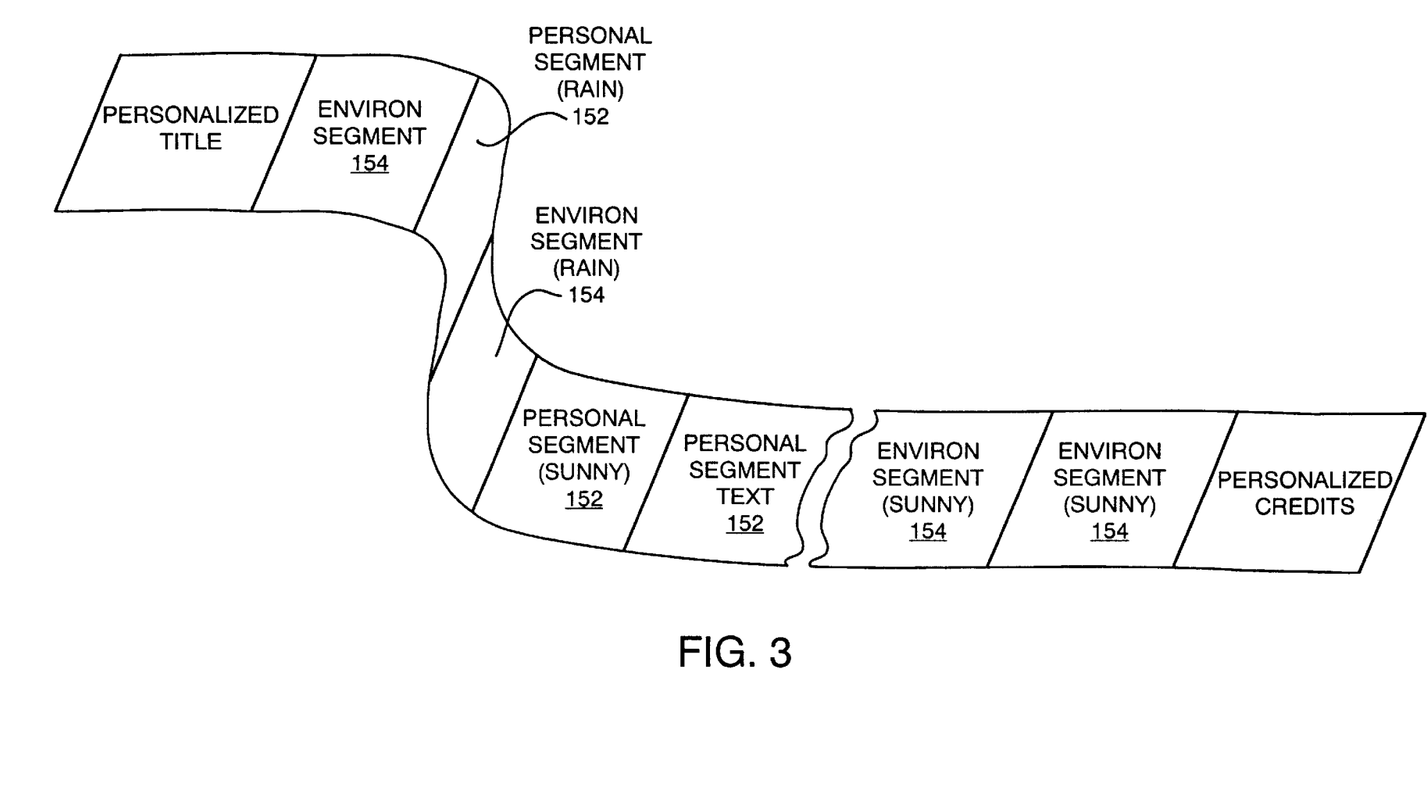
FIG. 3 is a schematic diagram illustrating a recording medium with segments of a personal video in accordance with the present invention.

Referring to FIG. 3, the above described system produces a recording medium 150, which may be a tape or disc, for example, which is configured to have a personal video with a plurality of personal video segments 152. Each of the personal video segments are recorded by a different video camera positioned at diverse geographic locations to record a different field of view. Each of the personal video segments 152 were recorded one at a time in response to an input by the subscriber. Additionally, in all of these different fields of view the subscriber is engaged in an activity or observing an attraction related to the particular field of view. The recording medium has a plurality of environ video segments 154 interleaved between selected ones of the plurality of personal video segments 153. Each of these environ video segments 154 were recorded prior to the recording of any of the plurality of personal video segments 152. In addition, none of the environs segments 154 include any of the individuals included in the personal video segments 152. Finally, the medium includes a plurality of video text segments, which are associated with selected ones of the personal video segments, and also include text, such as the title 158 of the personal video, descriptions 156 during the video, and credits 160 at the end thereof. Such text being determined by at least one of the individuals in the personal video segments. The personal type, environs type, and text of the video segments are contiguous on said recording medium to provide a single continuous production 150 commencing with one of the text video segments.

Figure 4:
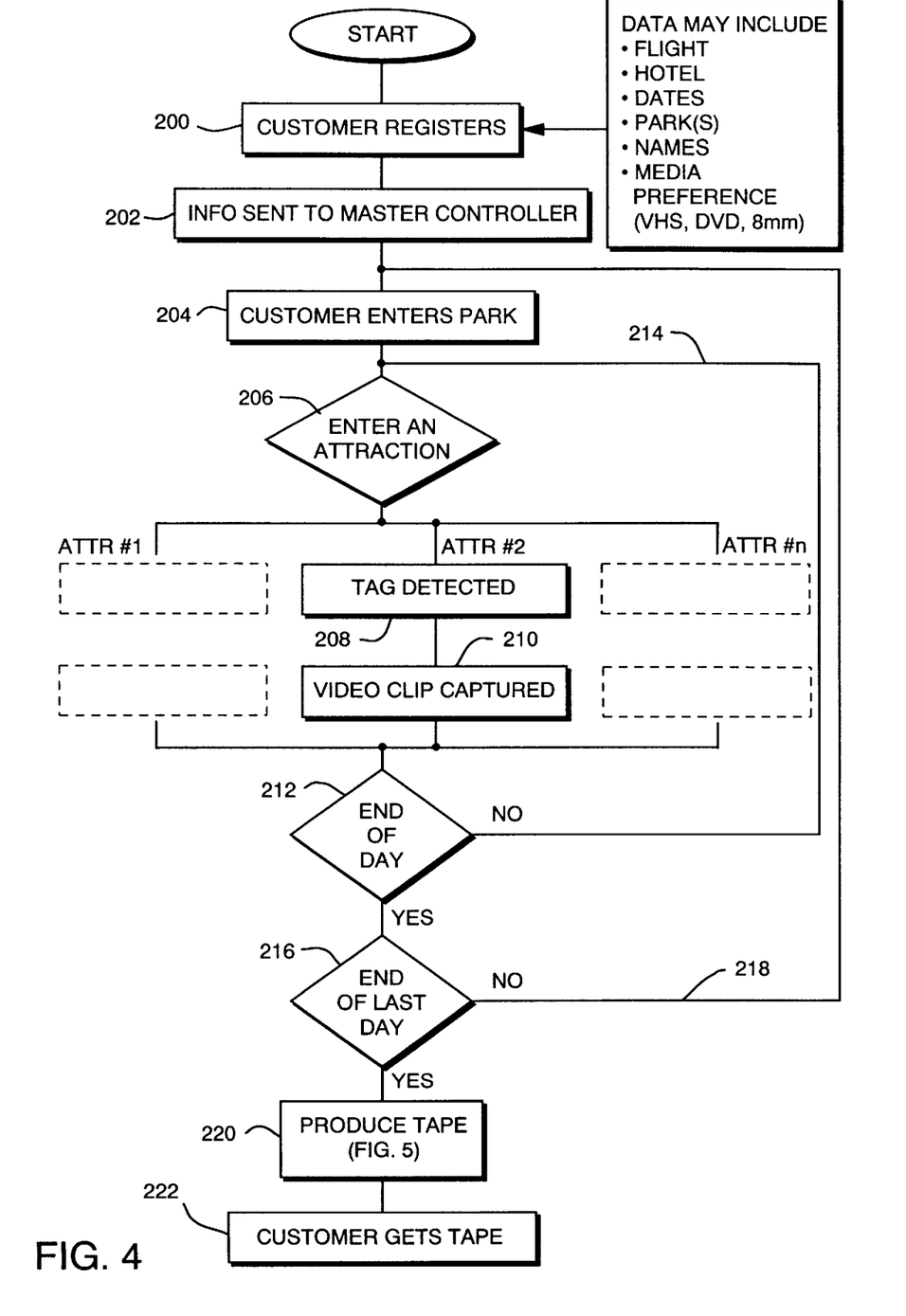
FIG. 4 is a flow chart illustrating the operation of the system in producing a video in accordance with the invention.
Figure 5:
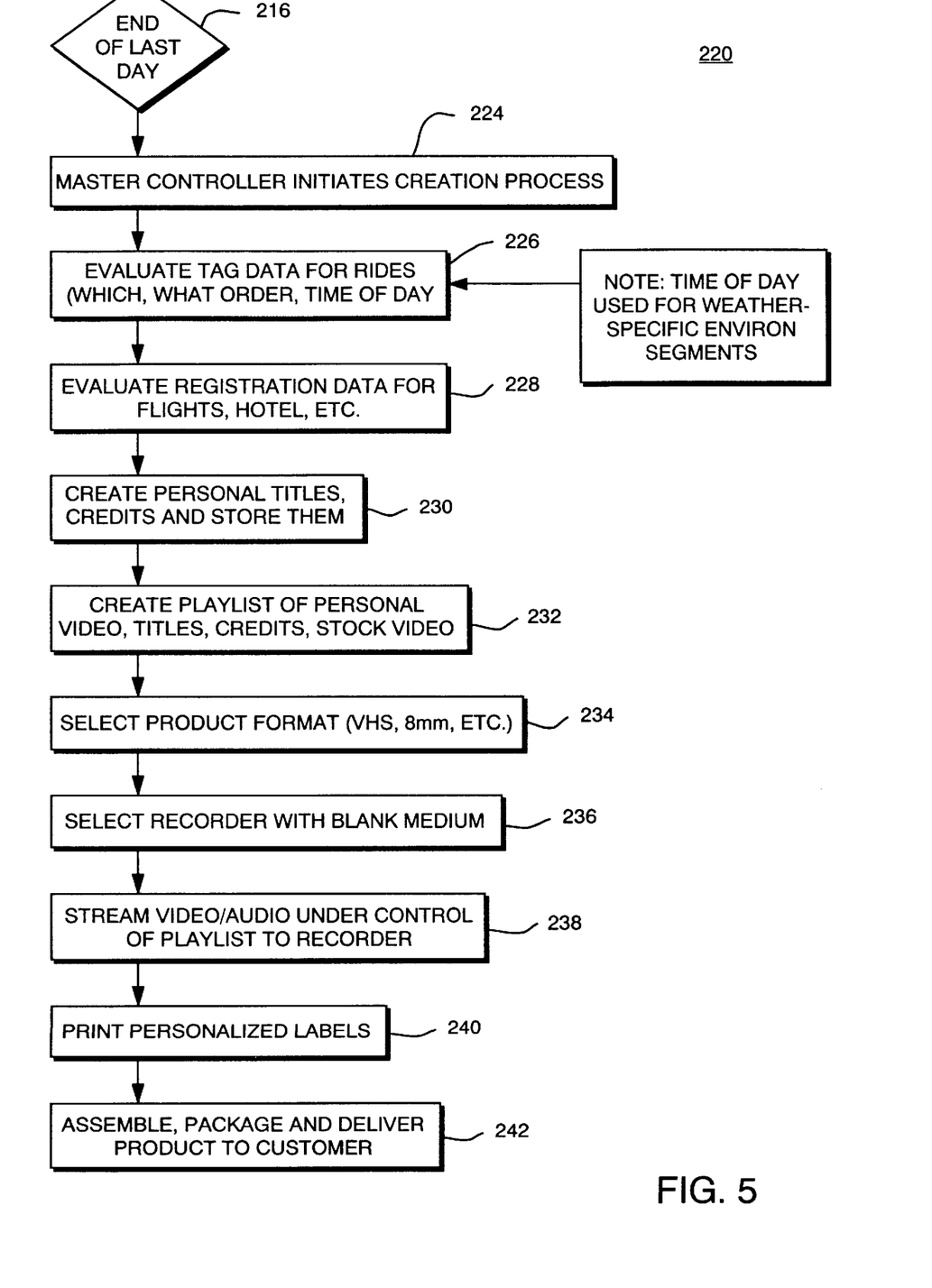
FIG. 5 is a flow chart illustrating the sub steps in the step of producing the tape illustrated in FIG. 4.

In operation, and referring to the flow charts of FIGS. 4 and 5, a method of producing a personal video, which includes personal segments having fields of view that include individual subscribers, fields of view that lack any of the subscribers and recorded separately from the personal segments, and fields of view that include text, first include entering and storing in the registration unit 10 personal data as indicated at block 200, such as the particular flight number for arrival and departure, the hotel at which the subscriber is staying, the dates involved, the name of the park or parks, the names of the subscriber and members of his party, the time period during which such registration is active, for determining, for example environ sequences for insertion between the personal sequences, and text including a desired personal title and personal credits. At the time of registration, the subscriber may select environ segments to follow the title, and other default environ segments to be interleaved among the personal segments, or may select certain stock segments related to the attraction being recorded when activating a particular camera. Also, the fee for producing the personal video can be charged to the subscriber's credit card at the time of registration if there is a minimum fee or single fixed price, or both at the time of registration, and when activating a particular camera if the fee is increased. In accordance with the number of personal sequences in the production. The information entered in the register is then sent to the master controller as indicated at block 202.

The subscriber and his party may now enjoy the park and its attractions at 204. Assuming the subscriber wishes to ride the ferris wheel, for example, at step 206, he or she inserts the previously activated card in the associated subscriber detector 120, at step 208 and the video is captured. Activation of the ferris wheel may start the camera, or if the camera is continually running, trigger the storage unit 60 to capture the sequence along with the identification. When the time for each personal segment expires, or upon the occurrence of an event such as the stopping of the ferris wheel, the camera or storage of the event ceases operation. At the completion of the capturing of the segment, the master controller checks the time of day at 212. If it is not the end of the day, the system is ready to capture on video the next attraction selected by the subscriber as indicated by line 214. The above operation may be repeated for as many attractions as the subscriber wishes. If the answer is Yes, the master controller checks to determine whether or not it is the end of the last day at step 216. If the answer is no, the subscriber may continue to capture the various attraction on video over line 218 as indicated. If the system detects that the time is the end of the last day or time which was stored in the system on arrival, the system produces the tape as indicated at block 220. After which, the customer can pick up the completed video of the visit as indicated at block 222. During operation of the camera the recording is stored in real time in the storage unit 60.

Referring to FIG. 5, in response to the indication that the time has expired at block 216, the master controller initiates the creation of the video at block 224, which instructions may be implemented in software, hardware, or combinations of hardware or software. The master controller 10 evaluates the tag data at block 226 to identify the rides and attractions selected for video by the subscriber, and in what order, including the actual day and time the camera was active for the particular attraction. Next, as indicated at 228, the master controller evaluates the registration data to determine the identity of the flights and hotel entered during registration. Then at step 230 the personal titles and credits are created and stored. The performance of steps 226, 228, and 230 do not necessarily occur in the sequence described. One of the important features of the present invention is the plurality of separately recorded environ segments that conform to the weather at any particular day, and time of that day in order to match the weather conditions of each personal video segment with its associated environ segment. The master controller uses the time information to match up a particular personal video segment with an environ segment to provide an authentic environment to the video. For example, if it were raining hard in the morning, but sunny in the afternoon, the master controller should select environ segments that illustrate rain for the rides and activities that took place in the morning and sunny environ segments for afternoon activities. This would also apply to weather conditions for showing arrival flight and hotel check-in. From this information, a playlist of personal video segments, environ video segments, and credits is created at 232. After creating the playlist, the product format is selected; that is, whether the final product is to be a VHS tape, eight mm or disc, for example, as shown at block 234. Next, a particular recorder, which has the appropriate blank medium is selected at step 236. The video/audio segments under control of the playlist is then streamed or downloaded to the selected recorder as shown at block 238. Upon completion of the recording, a personalized label is affixed to the recorder at 240. Finally, at 242 the recording is assembled and packaged for delivery to the subscriber prior to leaving the theme park.

Figure 6:
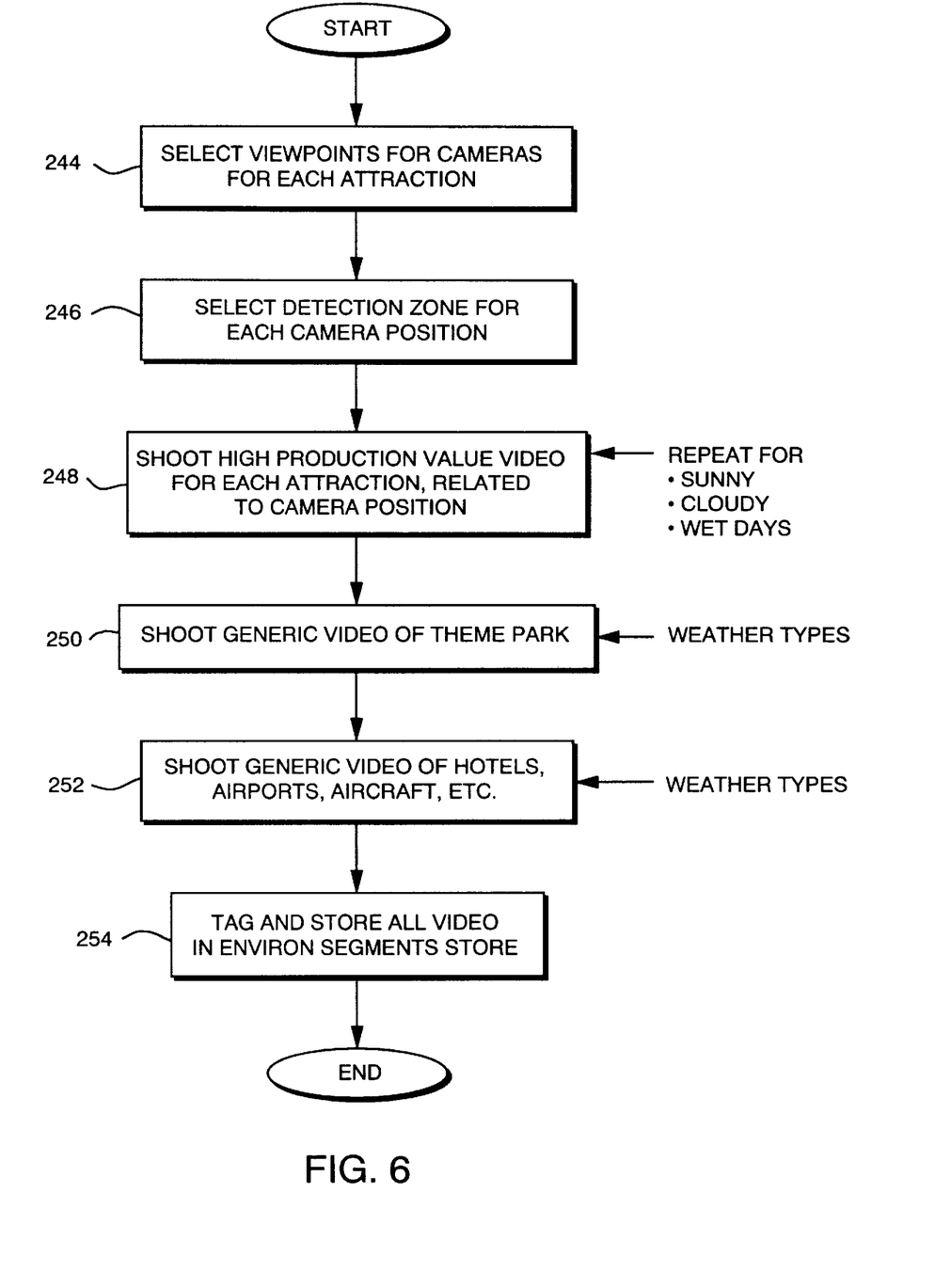
FIG. 6 is a flow chart illustrating the steps in producing the separately recorded environ segments.

In preparation for the production of the personalized video, and referring to FIG. 6, the system operator selects viewpoints for cameras at each attraction as indicated at block 244, and positions the camera to select a detection zone at 246. These detection zones correspond to the fields of view for each of the personal video segments. For each attraction, the system operator records a high production value video associated with each attraction related to the camera position as indicated by block 248 to provide the environ segments. These segments are created for various weather conditions, such as sunny, cloudy, or wet days as previously described. Additionally, the operator records generic scenes of the park or general area, as shown at: block 250, to create general environ segments, which also are repeated for various weather conditions. Also, as previously mentioned the operator records generic video segments of local airports, aircraft, and hotels under various weather conditions to create environ video segments that preface and follow the subscribers visits to the various attractions, as indicated at block 252. Each of the environ segments are identified and classified according to weather conditions. Thus, the operator can enter in the master controller, each change of weather condition, and the time of such change, so that the proper environ segments will be associated with the appropriate personal video segments. Once all of the environ segments have been recorded, the operator need only input to the master controller the time of each change of weather, which will result in an authentic personal video segments that have associated therewith environ segments displaying similar weather conditions.

It will be apparent to those skilled in the art that various modifications and variations can be made in the apparatus, method and production of the present invention without departing from the spirit or scope of the invention. Thus, it is intended that the present invention cover the modifications and variations of this invention provided they come within the scope of the appended claims and their equivalents.

What is claimed is:

1. A video recording medium configured to comprise:

a plurality of personal video segments recorded at spaced locations on the recording medium, each said personal plurality of video segments having been recorded by a different video camera of a plurality of video cameras to have a different field of view, each said different field of view including an individual common to all of the plurality of video segments engaged in an activity related to the field of view;

a plurality of environ video segments interleaved between selected ones of the plurality of personal video segments, said plurality of environ video segments having fields of view recorded prior to the recording of any one of the plurality of personal video segments, said plurality of environ video segments selected to display weather conditions similar to weather conditions existing at the time of recording the corresponding video segments, said fields of view of the plurality of environ video segments lacking any individual included in the fields of view of the plurality of personal video segments; and a plurality of video text segments associated with selected ones of the plurality of personal segments, having text determined by the individual common to the fields of view of the plurality of personal video segments.

2. The video recording medium according to claim 1 wherein said plurality of personal, environ, and text video segments are contiguous on said recording medium to provide a single continuous production commencing with one of the plurality of video text segments.

3. The video recording medium according to claim 1 wherein having a field of view wherein one of the plurality of personal video segments has a panned field of view.

4. The video recording medium according to claim 1 wherein each of the fields of view of the plurality of personal video segments include an attraction in an amusement park; and each of the environ segments has a field of view associated with a respective attraction displaying weather conditions existing at the time of recording the associated personal video.

5. A system for recording a personal video on a video recording medium, said personal video having a plurality of personal video segments, each including a subscriber in a field of view, a plurality of environ video segments, each including a field of view lacking the subscriber, and a plurality of video text segments, each including text in a field of view, said system comprising:

a registration unit responsive to inputs of a subscriber to store distinctive data, said distinctive data including subscriber identification and data for selecting the plurality of environ and text video segments;

a video collection subsystem including a plurality of video cameras and subscriber detectors, each of the plurality of video cameras being positioned geographically spaced from one another and oriented to record, when activated, one of the plurality of personal video segments, each of the plurality of subscriber detectors being associated with one of the plurality of video cameras and responsive to the distinctive data to generate an activation signal and a subscriber identification signal;

an environ segment storage module storing a plurality of environ segments;

a text generator;

a personal storage module;

a master controller governed by the registration unit to store one of the plurality of personal segments along with subscriber identification into the personal storage module in response to the activation and identification signal;

an assembly and processing module responsive to the master controller to assemble stored environ segments, stored personal segments, and generated text in accordance with the activities of the subscriber subsequent to the entry of information in the registration unit; and a personal production unit for permanently recording the plurality of segments on the recording medium.

6. The system of claim 5 wherein the environ segment storage module comprises a plurality of sets of environ segments, each set displaying a different one of a plurality of weather conditions, and further comprises:

weather selection means for selecting one of said sets of environ segments in accordance with weather conditions existing at the time of said selection.

7. A method of producing a plurality of personal videos concomitantly, wherein each of the personal videos include a plurality of personal segments, a plurality of environ segments, and text, said method comprising the steps of:

mounting a video camera at each of a plurality of geographically diverse locations and oriented to record a selected field of view;

positioning identification detectors at locations adjacent each of the selected fields of view to indicate activation by a particular subscriber;

storing in a registration unit the identity of a plurality of individual subscribers together with text and environ segments of separately recorded video fields of view selected by each of the plurality of individual subscribers;

triggering concomitantly a plurality of the video cameras to record the activities of the plurality of individual subscribers at each of the geographically diverse locations;

transmitting each of the recorded activities of the plurality of individual subscribers to a personal storage unit to store personal video segments of a plurality of different subscribers;

repeating the steps of triggering and transmitting to store a plurality of personal segments of the same individual subscribers and different individual subscribers;

selecting environ segments displaying weather conditions corresponding to weather conditions existing at the time of recording associated personal segments;

interleaving text and selected environ segments between the plurality of personal segments, having the same identification data, to form for each subscriber a personal video having assembled personal, environ and text segments upon completion of recording of personal segments of one identified subscriber; and duplicating concomitantly on each of a plurality of recording mediums the assembled interleaved personal videos of a respective individual subscriber to provide a video personal to each of the plurality of individual subscribers.

* * * * *